Aug. 5, 1941.　　　M. FULD ET AL　　　2,251,734
DIFFUSION AND DRIP APPARATUS
Filed July 20, 1939　　　2 Sheets-Sheet 1
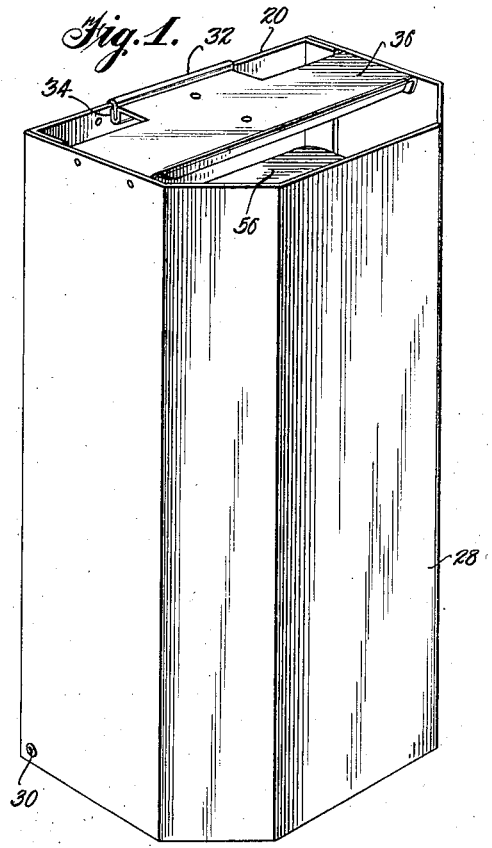
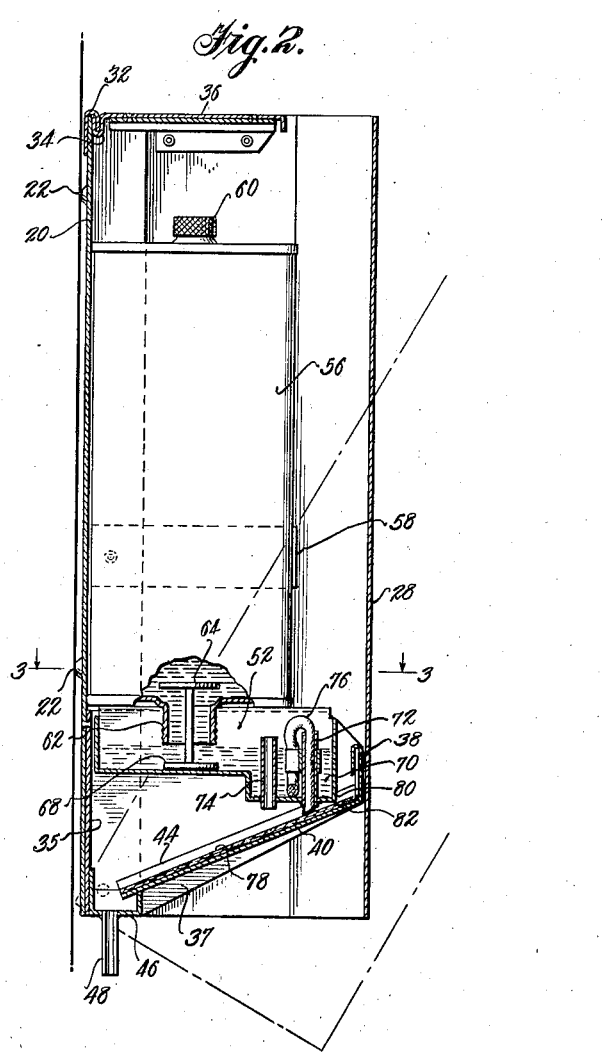
Inventors
Melvin Fuld and
Alfonso M. Leoni
By Raymond W. Colton
Attorney

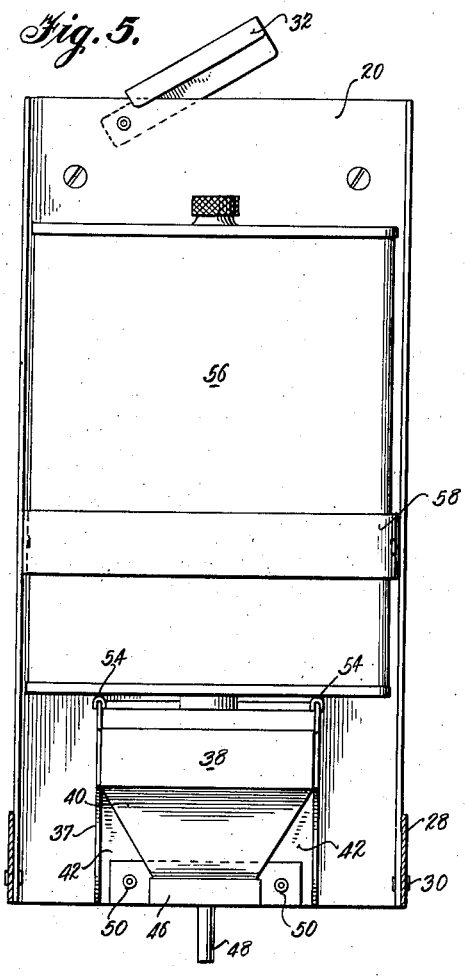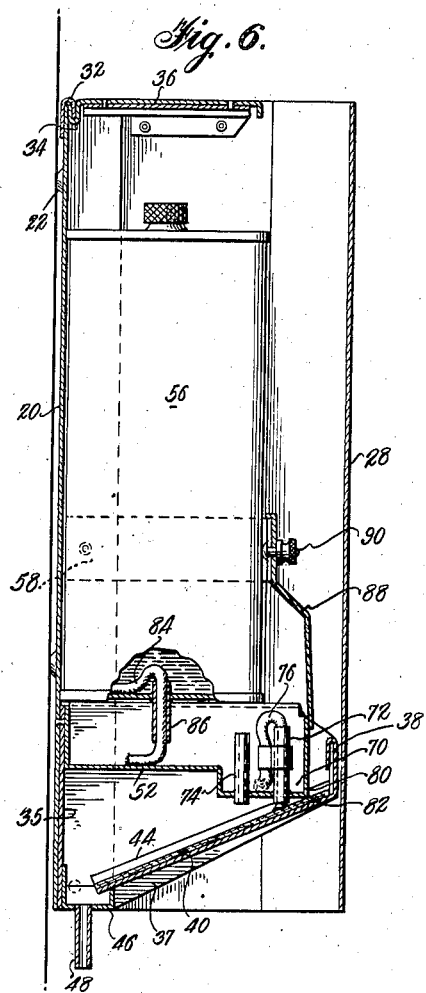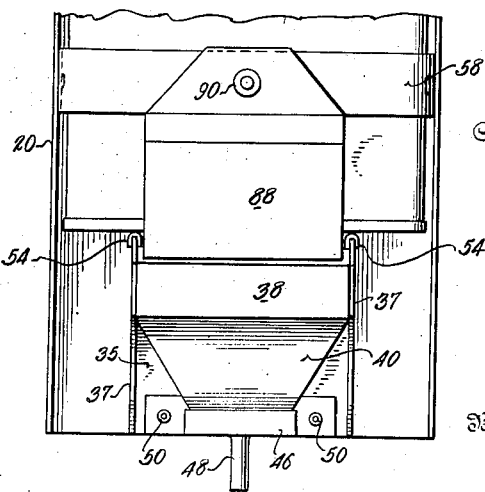

Patented Aug. 5, 1941

2,251,734

UNITED STATES PATENT OFFICE 2,251,734

DIFFUSION AND DRIP APPARATUS

Melvin Fuld, Baltimore, Md., and Alfonso M. Leoni, Beachwood, N. J.; said Leoni assignor to said Fuld Application July 20, 1939, Serial No. 285,613

12 Claims. (Cl. 261—103)

This invention relates to diffusion and drip apparatus of the type intended for use in deodorizing and disinfecting toilets, lavatories and the like.

Quite a number of devices for the same general purposes have been proposed in the past, but these prior art structures have been inefficient in operation, they have failed to coordinate the diffusing and dripping functions, and they have lacked the desirable qualities of simplicity, adjustability and appearance. It will be understood by those skilled in the art that the perfumed liquid employed in such devices is supposed to contribute a portion of its perfume or odor to the air in the room, the remainder of the odor being carried with the less volatile portions of the liquid to the water closet, urinal, or other apparatus to be treated.

In accordance with the present discovery, it has been found to be highly desirable to provide a continual flow of liquid for supplying the odor to the surrounding air and then passing the partially spent liquid to the plumbing apparatus or fixture to be treated. In this manner, the liquid giving up a portion of its odor to the surrounding atmosphere is continually being renewed, thus providing a substantially constant and adequate quantity of the more volatile deodorant substance and assuring proper diffusion.

It is also a feature of the present invention to provide a Venturi-like throat for at least a portion of the air passing through the casing of the device, whereby the odorizing or deodorizing vapors are intimately and completely combined with the air for circulation therewith through the room. This Venturi-like or convergent-divergent throat is defined by the adjacent surfaces of a pan adapted to receive a body of liquid, and an inclined trough arranged below the pan to receive liquid from the pan. Liquid is fed from the pan to a point near the upper end of the tray, and after passing over the tray, the liquid is delivered through a drip outlet to the apparatus which is ultimately to be fed with the liquid. For purposes of controlling the flow of liquid over the tray and providing adequate contact between the liquid and the air passing through the casing, the tray is provided with an absorbent surface. The pan may be supplied with liquid from a suitable container and the height of such liquid in the pan may be regulated by a barometric type of feed. The outlet of the container may be valved or provided with a capillary feed. The feed of liquid from the pan to the tray may likewise be of the capillary type and in addition, an overflow device is provided in the event the liquid level in the pan should accidentally assume a height greater than intended.

The pan may be removably mounted in the casing and adjustable with respect thereto in order that the various elements may be cleaned, to permit variation of the size of the Venturi type throat, and to change the length of the path of liquid over the tray.

A more complete understanding of the present invention will be possible upon consideration of the accompanying drawings wherein:

Fig. 1 is a perspective view of the apparatus;

Fig. 2 is an elevation partly in section of the apparatus shown in Fig. 1;

Fig. 3 is a section taken along line 3—3 of Fig. 2 with the receptacle removed;

Fig. 4 is a perspective of a detail;

Fig. 5 is a front elevation of the device with the front casing section lowered;

Fig. 6 is an elevation similar to that shown in Fig. 2 of a modification; and

Fig. 7 is an elevation similar to Fig. 5 of the modification shown in Fig. 6.

The two part casing for housing the apparatus of the present invention comprises a rear casing section 20 provided with apertures 22 adapted to receive screws 24 or other fastening means for supporting the apparatus upon a wall 26. A front casing section 28 is pivotally mounted with respect to the rear casing section by means of rivets 30 or the like, permitting the casing to be opened for inspection, filling, cleaning or adjustment. The casing sections are held in closed position by means of a latching element 32 pivoted to the rear casing section and engaging a flange 34 formed on a reinforcing element 36 carried by the front casing section. This reinforcing element does not completely close the upper end of the casing since it is important that air be permitted to circulate through the casing for proper operation of the apparatus of the present invention.

Riveted or otherwise suitably attached to the lower end of the rear casing section there is provided a supporting frame having a vertical rear wall 35, vertical side walls 37 and a vertical front wall 38. The upper end of the frame is open while its lower end is partly open and partly closed by an inclined tray 40. The inclined tray converges somewhat towards its lower end, thereby leaving substantially triangular apertures 42 between the edges of the tray and the vertical side walls of the frame. The longitudinal edges of the tray 40 are upturned to define flanges 44 so that the tray somewhat resembles a trough or gutter. The lower end of the tray feeds into a shallow container 46 to the lower end of which is attached a drip outlet 48. The supporting frame and its associated parts are suitably supported by the rear wall of the rear casing section by the means of rivets 50 or the like.

A pan 52 is supported by the frame above the inclined tray, by means of downturned edges or flanges 54 slidably engaging the upper edges of the vertical side walls 37 of the frame. This pan is adapted to receive odorizing or deodorizing liquid from a suitable source of supply and is preferably arranged to maintain a substantially constant liquid level in order to assure uniform operation. Accordingly, resting upon the upper edges of the pan, there is a suitable container or receptacle 56 embraced by a retaining strap 58 secured to the rear casing section. The upper end of the receptacle is provided with a filling opening and cap 60, whereas the lower end is provided with a spout 62, shown, in Fig. 2 of the drawings, as provided with a valve 64 mounted on a valve stem 66 and having a retainer 68. When the container is lowered into the position shown in Fig. 2 of the drawings, the valve stem 66 and retainer 68 strike the bottom of the pan, lifting the valve 64 from its seat on the spout, and permitting liquid to flow into the pan until it reaches the mouth of the spout 62. The front end of the pan is provided with a sump 70 in which is fixed a wick tube 72 and an overflow tube 74. A wick 76 is arranged in the tube 72 so that one end trails in the sump and absorbs liquid therefrom while the other end delivers liquid to the inclined surface of the tray arranged therebelow. The delivery to the tray is near the upper end thereof in order that liquid flowing over the tray will have a long path to follow before it is finally delivered from the drip outlet. The overflow tube 74 is also arranged above and near the upper end of the tray, so that if an excess quantity of liquid should collect in the pan, the excess will be conveyed by the overflow tube to the tray, over the tray, and finally, to the drip outlet. By sliding the pan on the frame, the extent of travel of the liquid down the tray may be varied, thus somewhat varying the extent of evaporation of the volatile portion and the rapidity of flow of the non-volatile or less volatile portion. In order to assure that a large contact area is provided between the flowing liquid and the air, the surface of the tray is provided with an absorbent body 78 which may be bibulous like blotting paper or assume other convenient forms. This material not only causes the liquid to spread out over the entire surface of the tray, but likewise retards the flow somewhat and makes possible a better and more complete contact between the air and liquid. It will be noted from Fig. 2 of the drawings, that the front lower edge 80 of the pan is rather close to the upper surface of the tray, the distances between the parts increasing on either side of this point. This arrangement defines what is in effect a Venturi-like or convergent-divergent throat 82, so that the air passing through the casing has an increased velocity and reduced pressure at this point, thus tending to pick up a large amount of vapor which has evaporated from the liquid fed to the tray. The vapors ordinarily used for apparatus of this type will be lighter than air, and accordingly, the currents will be upward through the casing and accordingly, the air entering the lower end of the casing will pass through the triangular apertures 42, then along the tray, up through the Venturi-like throat and out at the upper end of the casing.

The modification shown in Figs. 6 and 7 of the drawings differs very slightly from the embodiment already described. As shown in Fig. 6, in lieu of the valved outlet for the liquid container, a capillary feed from the container to the pan is provided by a wick 84 extending through a wick tube 86 formed on the lower end of the container. A further difference in this modification is the provision of a resilient element 88 for holding the pan in an adjusted position with respect to the rear casing section. The resilient element is mounted on the band 58 and its lower end engages the front wall of the pan 52. The resilient element may be secured to the band by means of a nut and bolt generally depicted at 90 or by other suitable means.

It is believed that the operation of the apparatus of the present invention will be clear from the foregoing description. The constructions described for purposes of illustrating the invention are not to be construed as limiting its scope except as provided in the appended claims.

We claim:

1. Diffusion and drip apparatus for diffusing deodorant material over an area and supplying liquid to a plumbing installation, comprising a casing open at its upper and lower ends to promote natural circulation, a pan within said casing adapted to hold a body of liquid, an inclined tray within said casing arranged immediately below said pan and defining therewith a constricted throat, means for feeding liquid from said pan to said tray, and a normally open drip outlet near the lower end of said tray for discharging liquid from said casing to said plumbing installation.

2. Diffusion and drip apparatus for diffusing deodorant material over an area and supplying liquid to a plumbing installation, comprising a casing open at its upper and lower ends to promote natural circulation, a pan within said casing adapted to hold a body of liquid, means for automatically maintaining a substantially uniform quantity of liquid in said pan, an inclined tray within said casing arranged below said pan and defining therewith a constricted throat, means for feeding liquid from said pan to said tray, and a normally open drip outlet near the lower end of said tray for discharging liquid from said casing to said plumbing installation.

3. Diffusion and drip apparatus for diffusing deodorant material over an area and supplying liquid to a plumbing installation, comprising a casing open at its upper and lower ends to promote natural circulation, a pan within said casing adapted to hold a body of liquid, an inclined tray within said casing arranged below said pan, wick means for feeding liquid from said pan to said tray, means for feeding overflow liquid from said pan to said tray, and a normally open drip outlet near the lower end of said tray for discharging liquid from said casing to said plumbing installation.

4. Diffusion and drip apparatus for diffusing deodorant material over an area and supplying liquid to a plumbing installation, comprising a casing open at its upper and lower ends to promote natural circulation, a pan within said casing adapted to hold a body of liquid, an inclined tray within said casing arranged below said pan, an absorbent surface provided on said tray, means for feeding liquid from said pan to said tray and over said surface, and a normally open drip outlet near the lower end of said tray for discharging liquid from said casing to said plumbing installation.

5. Diffusion and drip apparatus for diffusing deodorant material over an area and supplying liquid to a plumbing installation, comprising a casing open at its upper and lower ends to promote natural circulation, a pan within said casing adapted to hold a body of liquid, an inclined tray within said casing arranged below said pan, an absorbent surface provided on said tray, means for feeding liquid from said pan to said tray and over said surface, a passage for conducting air between the upper and lower ends of said casing and over said absorbent surface, and a normally open drip outlet near the lower end of said tray for discharging liquid from said casing to said plumbing installation.

6. Diffusion and drip apparatus for diffusing deodorant material over an area and supplying liquid to a plumbing installation, comprising a casing open at its upper and lower ends to promote natural circulation, a pan supported by said casing adapted to hold a body of liquid, an inclined tray supported by said casing below said pan, adjacent surfaces of said pan and tray defining a convergent-divergent throat, means for feeding liquid from said pan to said tray near the constricted portion of said throat, and a normally open drip outlet near the lower end of said tray for discharging liquid from said casing to said plumbing installation.

7. Diffusion and drip apparatus for diffusing deodorant material over an area and supplying liquid to a plumbing installation, comprising a casing open at its upper and lower ends to promote natural circulation, a pan supported by said casing adapted to hold a body of liquid, an inclined tray supported by said casing below said pan, the adjacent surfaces of said pan and tray defining a convergent-divergent throat, an absorbent surface provided on said tray, means for feeding liquid from said pan to said tray near the constricted portion of said throat and over said surface, and a normally open drip outlet near the lower end of said tray for discharging liquid from said casing to said plumbing installation.

8. Diffusion and drip apparatus for diffusing deodorant material over an area and supplying liquid to a plumbing installation, comprising a casing open at its upper and lower ends to promote natural circulation, a pan supported by said casing adapted to hold a body of liquid, an inclined tray supported by said casing below said pan, the adjacent surfaces of said pan and tray defining a convergent-divergent throat, capillary means for feeding liquid from said pan to said tray near the constricted portion of said throat, a passage for conducting air between the ends of said casing, over said tray and through said throat, and a normally open drip outlet near the lower end of said tray for discharging liquid from said casing to said plumbing installation.

9. Diffusion and drip apparatus for diffusing deodorant material over an area and supplying liquid to a plumbing installation, comprising a casing open at its upper and lower ends to promote natural circulation, a pan supported by said casing adapted to hold a body of liquid, an inclined tray supported by said casing below said pan, the adjacent surfaces of said pan and tray defining a convergent-divergent throat, means for feeding liquid from said pan to said tray near the constricted portion of said throat, means for adjusting the size of said throat, and a normally open drip outlet near the lower end of said tray for discharging liquid from said casing to said plumbing installation.

10. Diffusion and drip apparatus for diffusing deodorant material over an area and supplying liquid to a plumbing installation, comprising a casing open at its upper and lower ends to promote natural circulation, a pan supported by said casing adapted to hold a body of liquid, an inclined tray supported by said casing below said pan, the adjacent surfaces of said pan and tray defining a convergent-divergent throat, means for feeding liquid from said pan to said tray, means for adjusting the relative positions of said pan and tray to vary the size of said throat, and a normally open drip outlet near the lower end of said tray for discharging liquid from said casing to said plumbing installation.

11. Diffusion and drip apparatus for diffusing deodorant material over an area and supplying liquid to a plumbing installation, comprising a casing open at its upper and lower ends to promote natural circulation, a pan in said casing adapted to hold a body of liquid, a liquid container barometrically feeding said pan so as to maintain a substantially uniform quantity of liquid therein, an inclined tray below said pan, wick means for feeding liquid from said pan to said tray, a normally open drip outlet near the lower end of said tray for discharging liquid to said plumbing installation, and means retarding the flow of liquid over said tray.

12. Diffusion and drip apparatus for diffusing deodorant material over an area and supplying liquid to a plumbing installation, comprising a casing open at its upper and lower ends to promote natural circulation, a pan in said casing adapted to hold a body of liquid, a container for supplying liquid to said pan, an inclined tray below said pan, capillary means for feeding liquid from said container to said pan, means for feeding liquid from said pan to said tray, and a normally open drip outlet near the lower end of said tray for discharging liquid from said casing to said plumbing installation.

MELVIN FULD.
ALFONSO M. LEONI.